May 2, 1939.  E. SCHNEIDER  2,156,516
KITCHENER
Filed Nov. 1, 1937
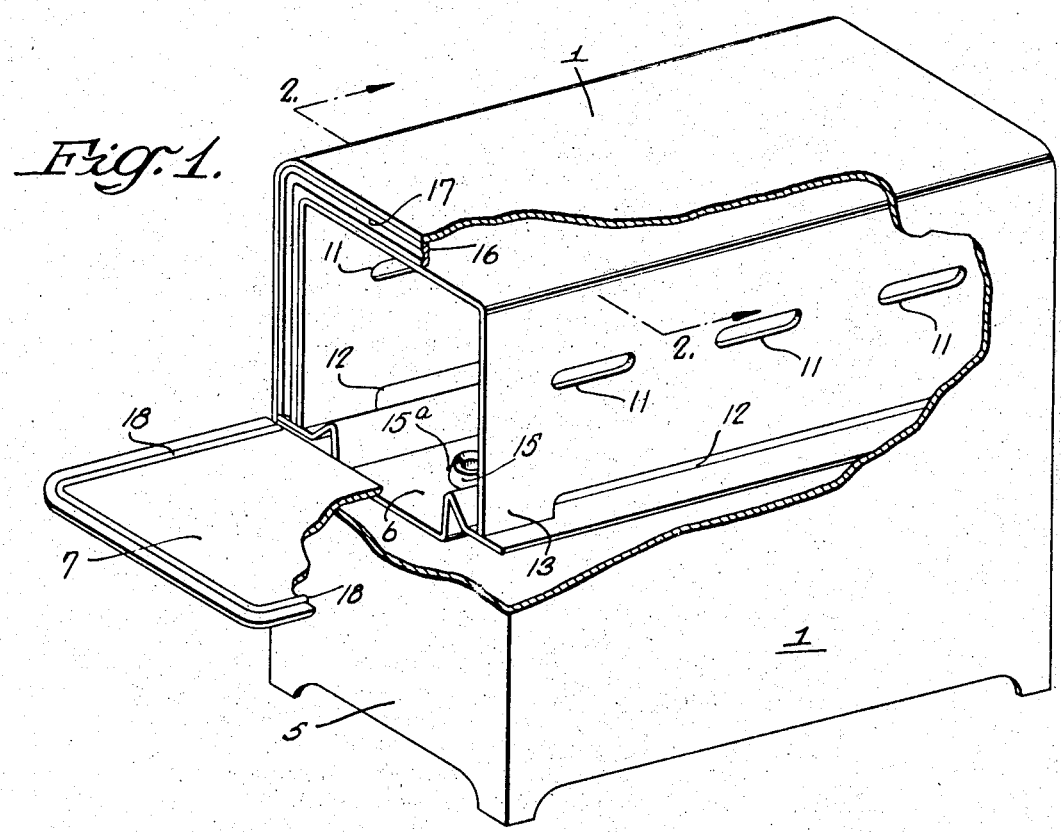
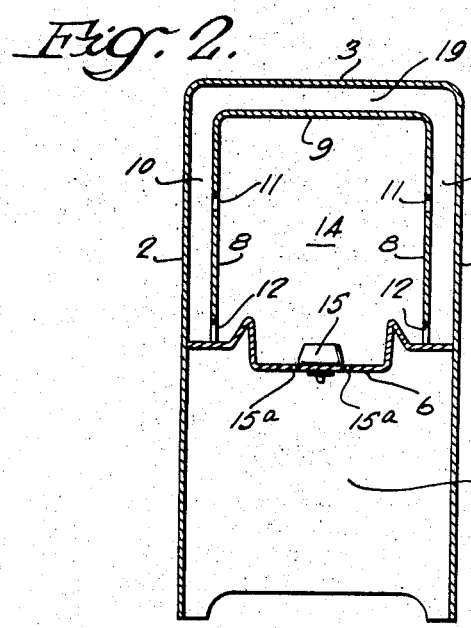
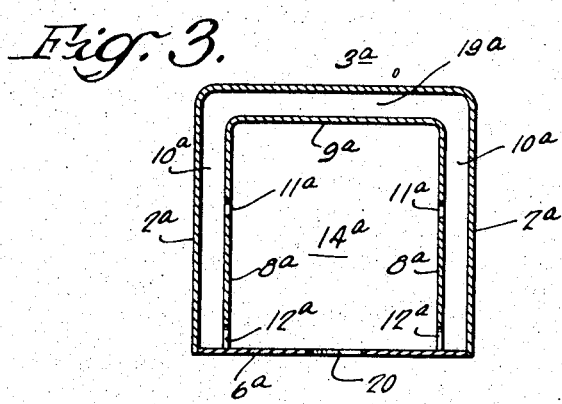
Inventor:-
Emil Schneider Patented May 2, 1939

2,156,516

UNITED STATES PATENT OFFICE 2,156,516

KITCHENER

Emil Schneider, Philadelphia, Pa.

Application November 1, 1937, Serial No. 172,093

2 Claims. (Cl. 126—273)

This invention relates to a novel kitchener and more particularly to a novel device for conditioning or cooking substances, such as foods, by the application of heat.

One object of the invention is to provide a novel device of this character, which is constructed and arranged to condition or cook substances, such as foods, in a manner to retain all of the desirable essences of the said substances that are lost by prior and conventional methods. In the case of foods, for example, the flavoring and nutritious vapors, which are normally permitted to escape, are by the present process retained and serve to impart desirable qualities to the cooked food.

Another object of the invention is to provide a novel conditioning device by means of which the vapors and steam that are generated or given off by the heating of a substance, are consumed by a circulative, incinerating process.

A further object of the invention is to provide a device of the character above mentioned in which the escape of odors vapors, steam, etc. into the atmosphere is prevented, thereby eliminating the undesirable effects and inconvenience normally caused by the escape of such agents.

The invention may be clearly understood by reference to the accompanying drawing, in which Fig. 1 is a perspective view of one form of the device with a portion thereof broken away for clarity of illustration;

Fig. 2 is a sectional view taken transversely of the device along line 2—2 of Fig. 1; and Fig. 3 is a sectional view of a modified form of the device.

Referring to Figs. 1 and 2 of the drawing, in the specific form of the device there illustrated, there is provided an outer casing 1 comprising side walls 2, a top 3, a rear wall 4, and a partial front wall 5. A horizontal panel 6, which is preferably of the cross-section shape illustrated, is attached to the walls of the casing, forming a compartment which is provided with a hinged door 7 at the front to permit access to the compartment. The sides, the back, and the top of this compartment are thus completely and permanently closed, there being no vents, chimneys or other openings, and when the door is closed it completely seals the front wall of the compartment from the outside air, as will be explained presently.

Within the compartment defined as above described, there is provided a walled structure of inverted U-shape comprising side walls 8 and a top 9 which are spaced respectively from the side walls and top of the casing 1, thus providing a jacket-like space 10 between the inner and outer walls about the inner compartment. The purpose of this will be explained presently. The inner walled structure is supported upon and secured to the panel 6 which serves as a bottom or base for the inner compartment.

In further accordance with the invention, there are provided apertures 11 in the side walls 8 near the top thereof and there are also provided lower apertures or passages 12, portions of which are substantially vertically aligned with the apertures 11. As illustrated, the side walls 8 may be cut away to provide feet-like extensions 13 and at the same time, provide the elongated passages 12.

The central horizontal portion of the panel 6 serves as the bottom for the oven-like space 14 within which substances, such as foods, are placed to be heat-conditioned or cooked, following the practice of the invention. One or more heat sources 15 are provided and may be supported by the panel 6, which sources may take any suitable form, for example they may be conventional gas burners or electrical heating units. Restricted openings 15a are provided adjacent the heat sources to permit a restricted inflow of air to the burners and to the compartment 14.

At the front of the device, there is provided an inverted U-shaped member 16 which serves to close the jacket-like space 10 at the front thereof. In order to seal the oven-like compartment 14 when the door 7 is closed, the member 16 may be provided with a recess 17 and the door may be provided with a complemental rib 18, which may be formed of resilient material. When the door is closed, the rib 18 seats in the recess 17 thus sealing the compartment 14 against admission of air.

In the operation of the device, the substances such as foods to be conditioned or cooked are placed within the oven-like compartment 14 in any suitable manner, for example such substances may be placed in conventional cooking pans which may be supported upon racks or other supporting means. If desired, removable wire shelves may be provided for this purpose, as in conventional ovens. As the substance is subjected to the cooking effect of the heat from the sources 15, the vapors, and/or steams, which are generated or given off, pass upward and out through the upper apertures 11 to the jacket-like space 10. Due to the pressure effect within the space 14, the vapors and steam which are not initially incinerated are caused to flow downward through the side passages 10 and are forced through the lower openings 12 back into the oven-like space 14. The circulated vapors or steam are consumed by incineration within the compartment 14, the complete consumption of the vapors or steam taking place during the repeated circulation thereof. It is important to note that the heating source or sources of my device serve a three-fold purpose; first, it cooks the substance; second, it causes circulation of the vapors or steam; and third, it incinerates the circulated vapors or steam, thereby eliminating the necessity of allowing the vapors or steam to escape into the surrounding atmosphere.

It is important to note that the device when in operation is completely closed, there being no vents, chimneys or other passages leading to the atmosphere. Thus, all of the products derived from the cooking operation are retained within the device.

It will be noted that the top space 19 of the jacket-like space 10 serves only as a heat insulating space, and if desired, this top space may be filled with heat-insulating material.

In Fig. 3, there is shown a simple form of the device which is box-like in shape and corresponds to the upper portion of the device of Figs. 1 and 2. In this modified form of the device, the bottom 6a is provided with openings 20 to accommodate heat sources, such as gas burners or electric heating units. This device is adapted to be placed upon a conventional gas or electric stove with the gas burners or electric heating units below the openings 20. Thus, there is provided a simple device for use on the conventional stove. Otherwise, this device is similar in construction and operation to the device above described.

Although the invention has been illustrated and described herein with reference to certain specific structural forms, it will be understood that such illustrations are only for the purpose of disclosing the invention and various other forms of the invention are possible and may be resorted to.

I claim:

1. In a device of the class described, a casing having a door opening permitting access to the interior thereof, a door for said opening, and a walled structure within said casing defining an inner compartment and substantially vertical passages on opposite sides of said compartment between said casing and said compartment, said walled structure having upper and lower openings connecting said compartment with said passages, the bottom of said compartment having provision for means for heating the interior of the compartment, to thereby cook a substance within said compartment and cause cyclic circulation and incineration of vapors and steam.

2. In a device of the class, described, a walled structure defining a cooking compartment and having a door opening permitting access to said compartment, and another walled structure exterior to said first walled structure and defining passages between the walls of said structures, said first walled structure having upper and lower openings connecting said compartment with said passages, the bottom of said compartment having provision for means for heating the interior of the compartment, said exterior walled structure being free of escape openings to the atmosphere, whereby a substance within said compartment is cooked by cyclic circulation of vapors and steam flowing downward through said passages and by incineration of the vapors and steam within said compartment.

EMIL SCHNEIDER.